United States Patent [19]

Ikemori et al.

[11] Patent Number: 4,684,223
[45] Date of Patent: Aug. 4, 1987

[54] ZOOM LENS OF THE REAR FOCUSING TYPE

[75] Inventors: Keiji Ikemori, Kanagawa; Masatake Kato, Tokyo, both of Japan

[73] Assignee: Canon Kabushiki Kaisha, Tokyo, Japan

[21] Appl. No.: 819,991

[22] Filed: Jan. 15, 1986

Related U.S. Application Data

[63] Continuation of Ser. No. 442,573, Nov. 18, 1982, abandoned.

[30] Foreign Application Priority Data

Nov. 26, 1981 [JP] Japan .................. 56-190034

[51] Int. Cl.⁴ .................. G02B 9/64; G02B 15/177
[52] U.S. Cl. .................. 350/427; 350/423
[58] Field of Search .................. 350/427, 423

[56] References Cited

U.S. PATENT DOCUMENTS

| 2,959,101 | 11/1960 | Sandback et al. | 350/427 |
| 3,972,056 | 7/1976 | Tsujimoto et al. | 350/430 |
| 4,196,969 | 4/1980 | Itoh | 350/423 |
| 4,198,127 | 4/1980 | Itoh | 350/423 |

FOREIGN PATENT DOCUMENTS 0165107 12/1981 Japan .................. 350/423

Primary Examiner—John K. Corbin
Assistant Examiner—Rebecca D. Gass
Attorney, Agent, or Firm—Toren, McGeady & Associates

[57] ABSTRACT

In the disclosed zoom lens of the rear focusing type, three lens groups are axially moved for zooming from the wide angle to the telephoto settings or vice versa. A focusing action is imparted into the second or third lens group counting from the front object end, and the latter groups are arranged for moving in one direction during zooming from the wide angle to the telephoto settings.

3 Claims, 63 Drawing Figures

PRIOR ART
FIG. 1(a)
PRIOR ART
FIG. 1(b)
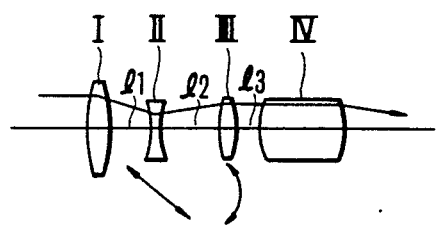
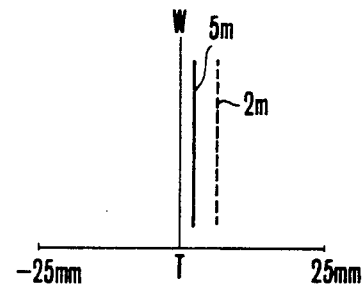
PRIOR ART
FIG. 1(c)
PRIOR ART
FIG. 1(d)
PRIOR ART
FIG. 1(e)
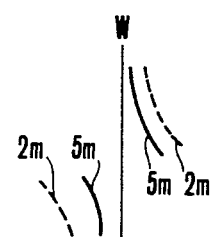
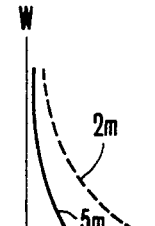
FIG. 2
FIG. 3
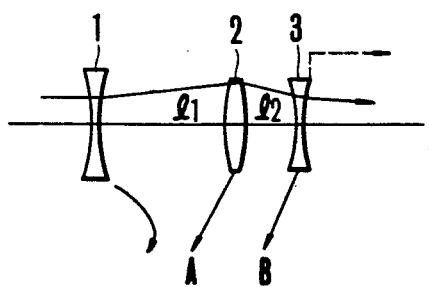
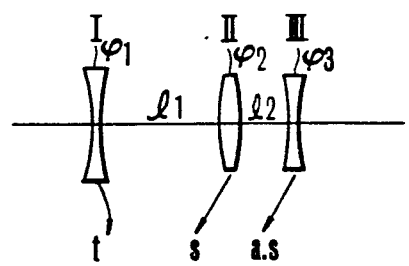

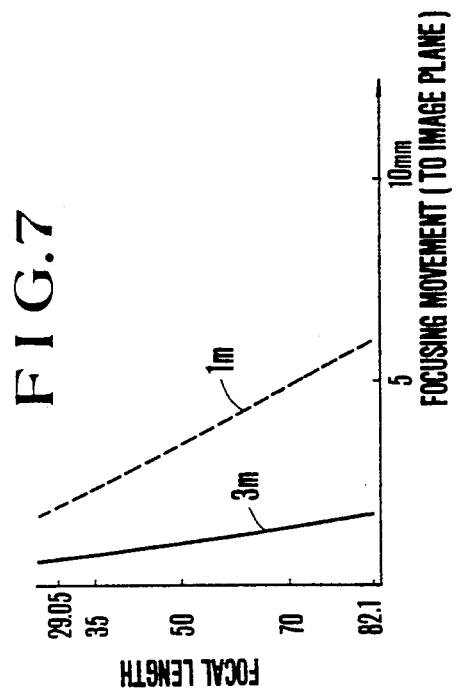
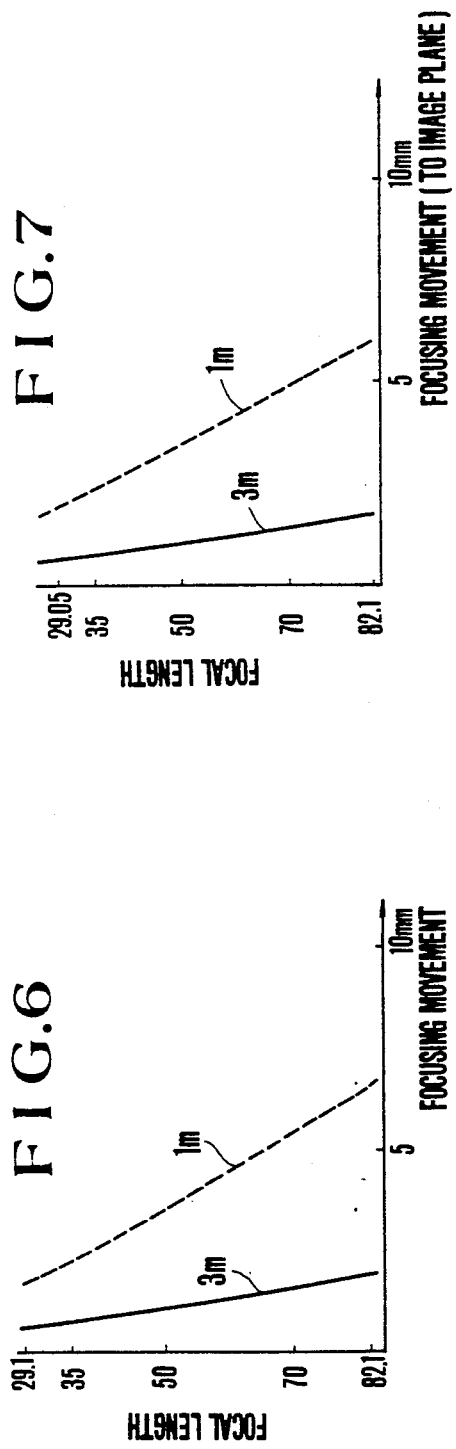
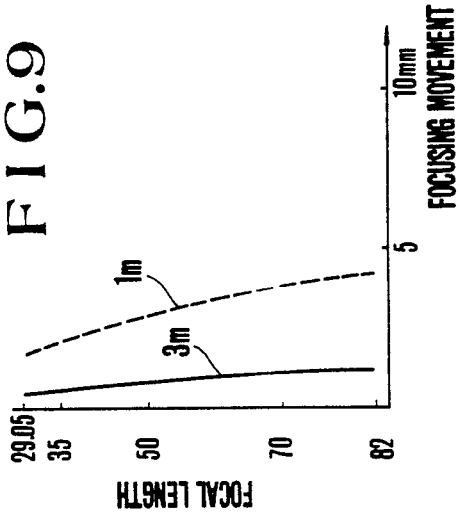
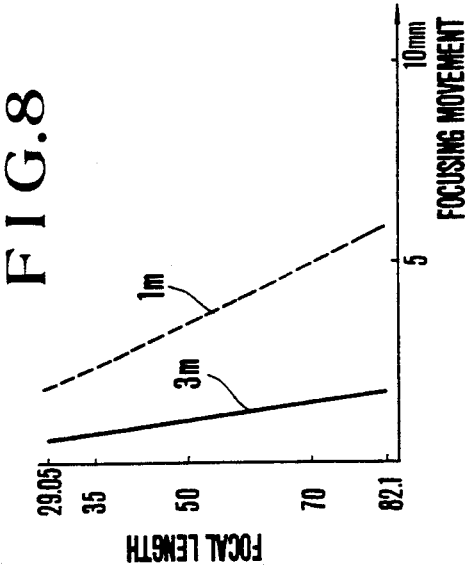

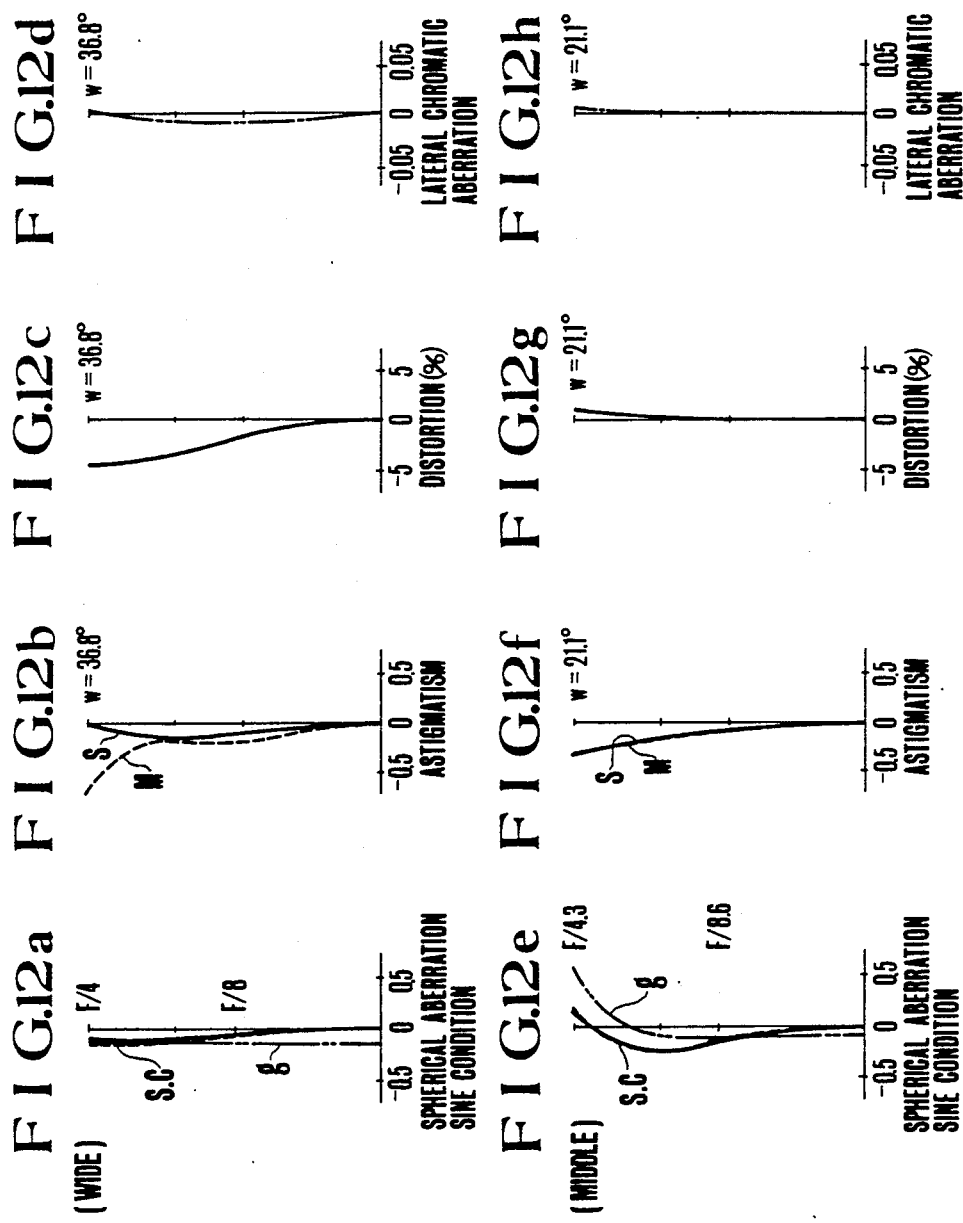

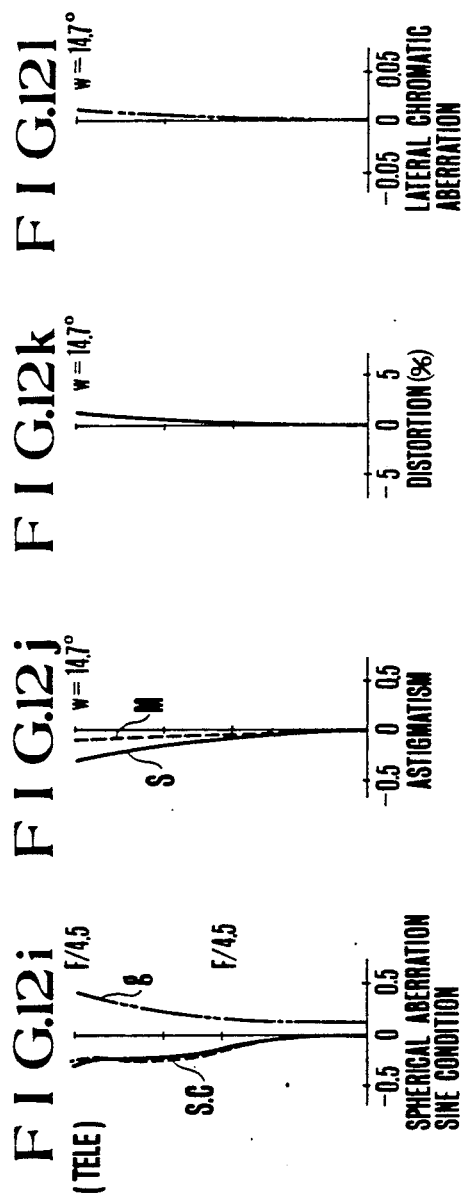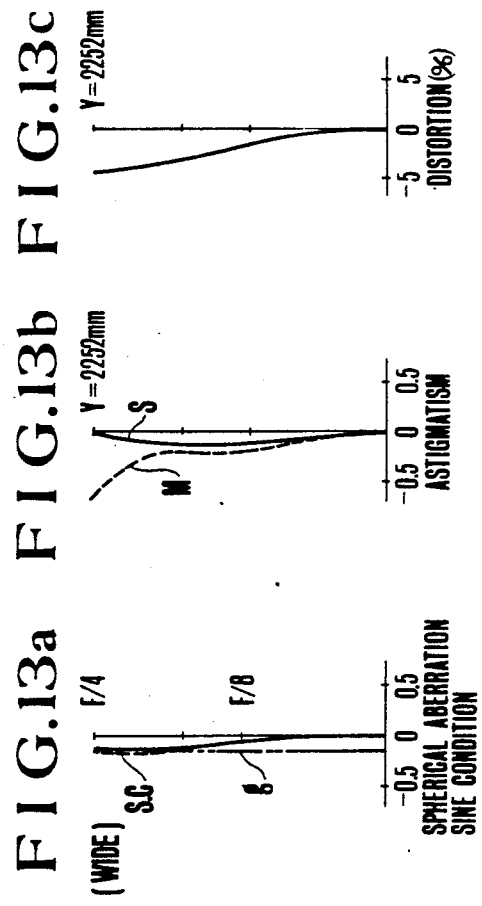

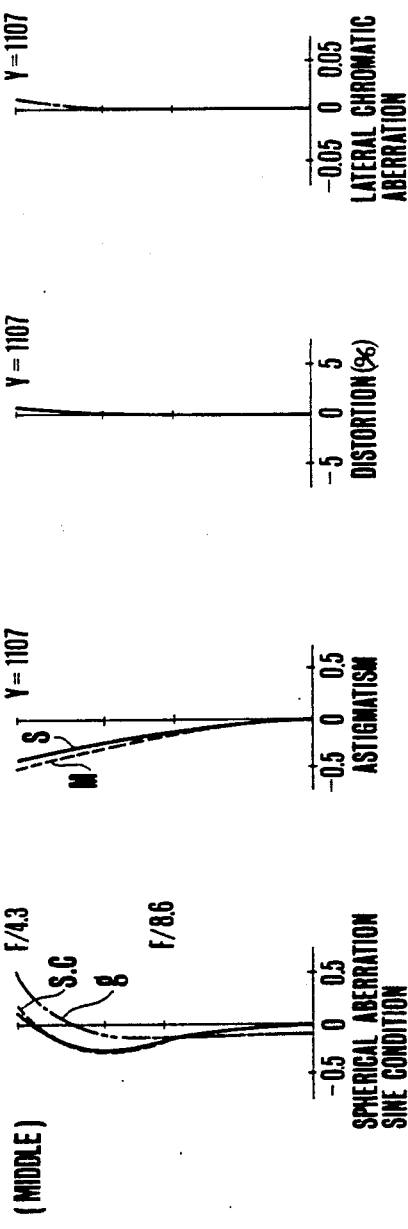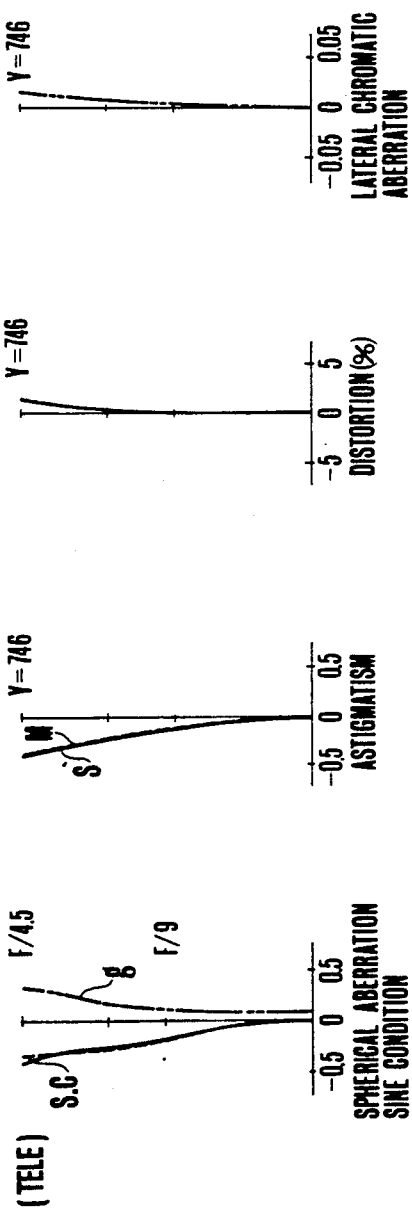

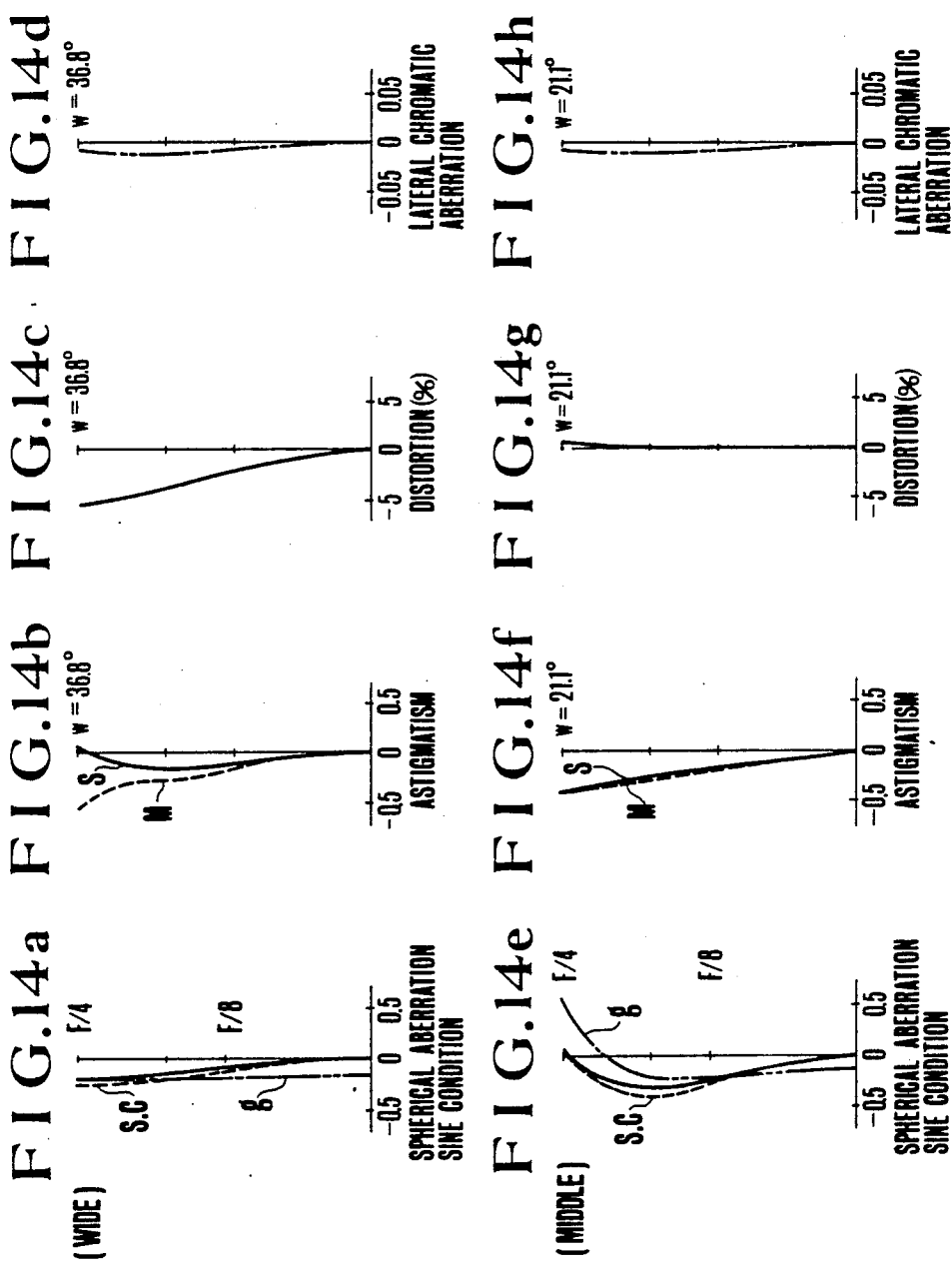

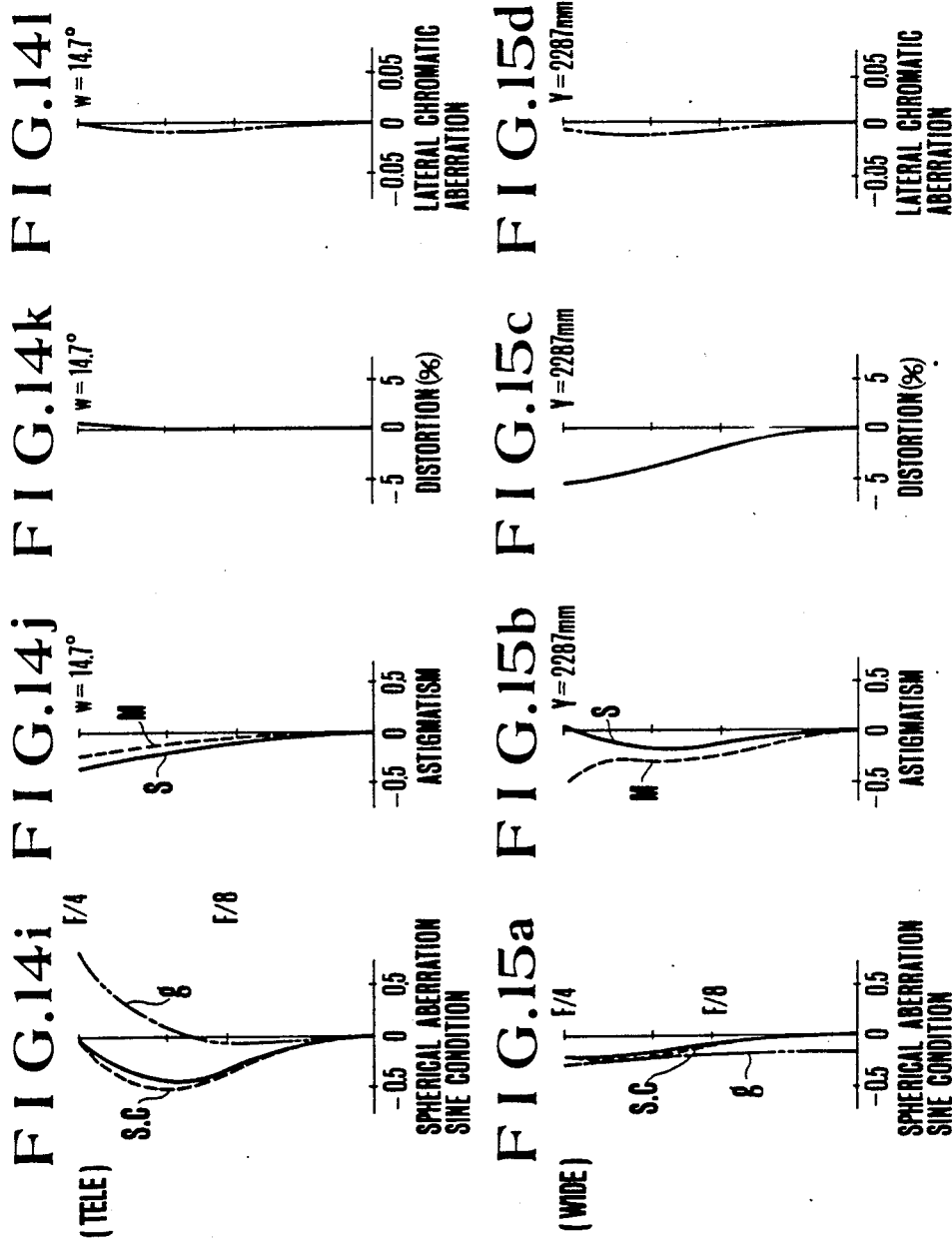

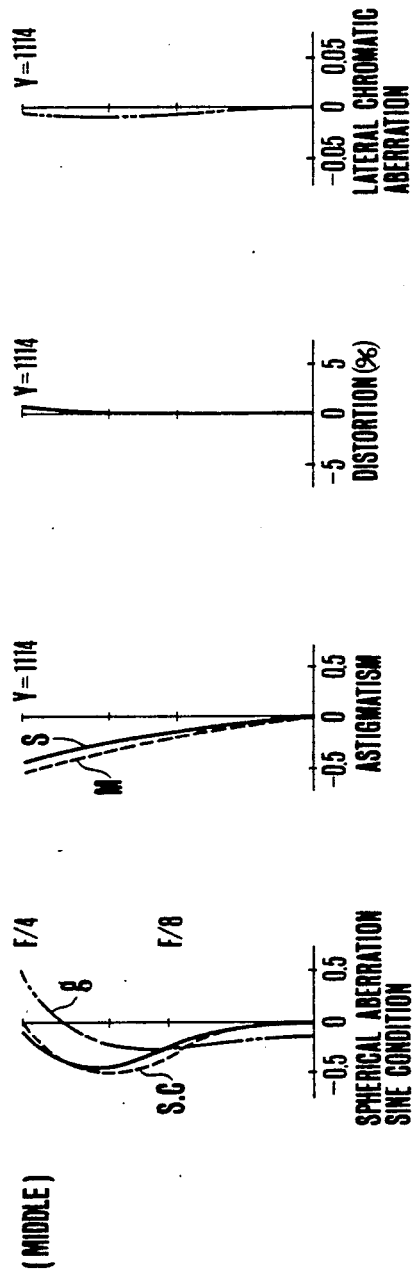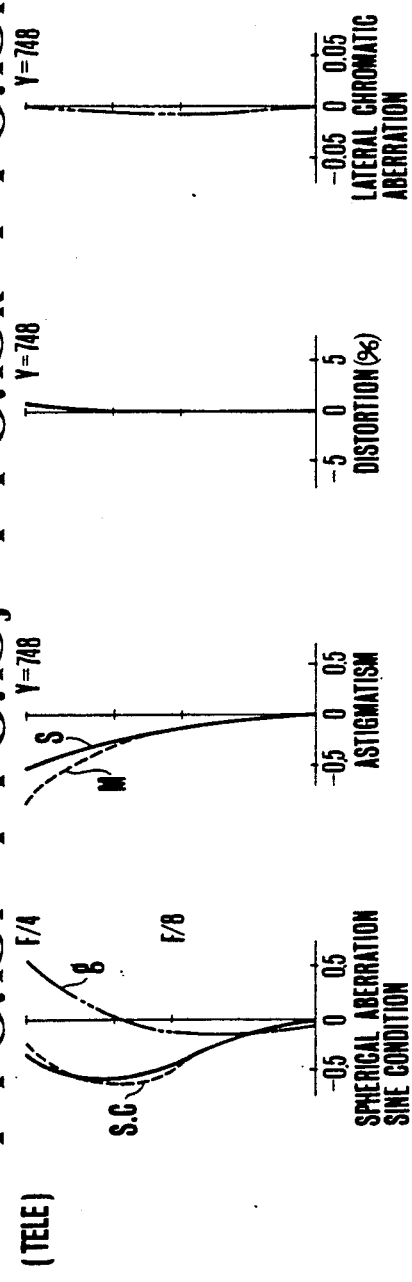

ZOOM LENS OF THE REAR FOCUSING TYPE

This is a continuation of application Ser. No. 442,573, filed Nov. 18, 1982, now abandoned.

BACKGROUND OF THE INVENTION

1. Field of the Invention

This invention relates to zoom lenses of the rear focusing type, and more particularly to zoom lenses in which zooming is accomplished by moving three lens groups axially in differential relation and in which focusing is accomplished at the second or third group counting from front of the three lens groups.

2. Description of the Prior Art

Proposals have been made for a wide variety of zoom lenses which are focused at a part of the zoom section or a lens group which remains stationary during zooming in the rear of the zoom lens groups.

These focusing methods require one to differentiate between the amount of movement of the focusing section required for one object distance as the focal length changes with zooming, and the amount of focusing movement which varies with focal length along a complex curve or discontinuously. The complex curve changes in shape with the object distance. Therefore, an operating mechanism that allows the same angle of rotation of the distance adjusting ring to effect accurate focusing throughout the entire zooming range is of extremely complicated structure and in actual practice it is very difficult to realize. This tendency is increasingly intensified as the zoom ratio increases.

An example of a conventional four component zoom objective with the foregoing follows to show how a focusing movement changes as a different one of the four components is selected for focusing purposes. For this purpose, reference is made to FIGS. 1(a) to 1(e).

The zoom objective of FIG. 1(a) has four components I to IV of the following respective focal lengths f1 to f4 with air separations 11 to 13 variable during zooming and with an object at infinity.

| f1 | 110 | f | 80 | 144 | 200 |
| f2 | −40 | 11 | 10 | 36.67 | 46 |
| f3 | 111.167 | 12 | 44.5 | 23.17 | 4.5 |
| f4 | 121.273 | 13 | 15 | 9.67 | 19 | f1-f4: focal length of individual lens groups
11-13: principal point distance between individual lens groups Using the negative-power second component II, the third component III movable for zooming, and the first component I for focusing is widely accepted in the prior art. Under these circumstances, while focusing down from infinity to an object at a given distance, the axial movement of first component I is maintained con stant at any location throughout the entire zoom range as illustrated in FIG. 1(b). But when the focusing is performed at the second component or those that follow, the axial movement becomes dependent upon the focal length of the entire system as illustrated in FIGS. 1(c) to 1(e).

The second component II represents a system that changes from a reducing one to an enlarging one during zooming, and passing unity of magnification on the way. The second component II is of negative power. Hence, in a reducing region the second component II must be moved forwards to focus down to shorter object distances. In the other region, for enlarging, it must be moved rearwards to effect an equivalent focusing result. In the transit for unit magnification focusing becomes uncertain, as illustrated in FIG. 1(c). Thus, the axial movement becomes discontinuous.

The first to third components in this example of the prior art form an afocal system. Hence when focusing independently with the third component the paraxial rays of light emerging from the third component the paraxial rays of light emerging from the third component become diverging as the object distance shortens from infinity. (At this time, this component becomes an enlarging system of positive sign.) To correct these diverging rays and make them parallel, the third component III may be moved rearwards. Thus focusing is effected, as illustrated in FIG. 1(d).

Similar to the case of the first component I, to use the fourth component IV for focusing, the latter may be moved forwards, because the rays incident on the fourth component IV are parallel, as illustrated in FIG. 1(e). However, the afocal magnification of the zoom section varies with zooming. Thus the focusing movement must be controlled as a function of the focal length. In this case, it has been found that the focusing movement of the fourth component IV is proportional to the square of the afocal magnification rate.

Also, as the object distance shortens, this effect becomes more severe as shown by the second degree curves for 5 and 2 meters in FIGS. 1(c) to 1(e).

In conclusion, to impart focusing movement to the second component or those that follow in the zoom objective of the aforesaid form, it is necessary to use one of several devices. One must use either a three-dimensional cam or other suitable control member that provides variations of the focusing movement not only as a function of the object distance but also as a function of the focal length of the entire system which can be represented by a continuous curve of secondary degree over the entire zoom range (when the angle of rotation of the distance adjusting ring is made to remain constant for the same object distance during zooming), or an electrically operated focusing control mechanism equipped with a computer circuit within the lens system or with a TTL auto-focus device.

A zoom objective having three lens groups movable for zooming is disclosed in U.S. Pat. No. 4,196,969. A zoom objective focusing at a lens group other than the first is described in U.S. Pat. No. 3,972,056.

SUMMARY OF THE INVENTION

The present invention has the general object of eliminating the drawbacks of conventional focusing methods adapted for use in rear focusing type of zoom lenses and to achieve the possibility of controlling the focusing movement approximately as one and the same function of the focal length for different object distances.

According to a feature of the present invention a zoom lens in which there are three lens groups axially movable for zooming, has its focusing function imparted to the second or third of the aforesaid three lens groups which is moved forward when zooming is performed from the wide angle to the telephoto position.

BRIEF DESCRIPTION OF THE DRAWING

FIG. 1(a) is a schematic block diagram of a conventional zoom objective.

FIGS. 1(b) to 1(e) are graphs illustrating variations of the focusing movement with focal length and object distance when the lens groups of the objective FIG. 1(a) are selectively employed in focusing.

FIGS. 2 and 3 are schematic block diagrams of embodiments of zoom objectives according to the present invention.

FIGS. 5 to 9 are graphs illustrating variation of movement of the focusing group as functions of focal length with parameters of object distance according to Examples 1 to 5 of the invention respectively.

FIGS. 12-a to 12-1 and 13-a to 13-1 are graphic representations of the various aberrations of the zoom objective of FIG. 10 in different focal length positions with object at infinity and 3 meters respectively.

FIGS. 14-a to 14-1 and 15-a to 15-1 are graphic representations of the various aberrations of the zoom objective of FIG. 11 in different focal length positions with object at infinity and 3 meters.

Figure 4:
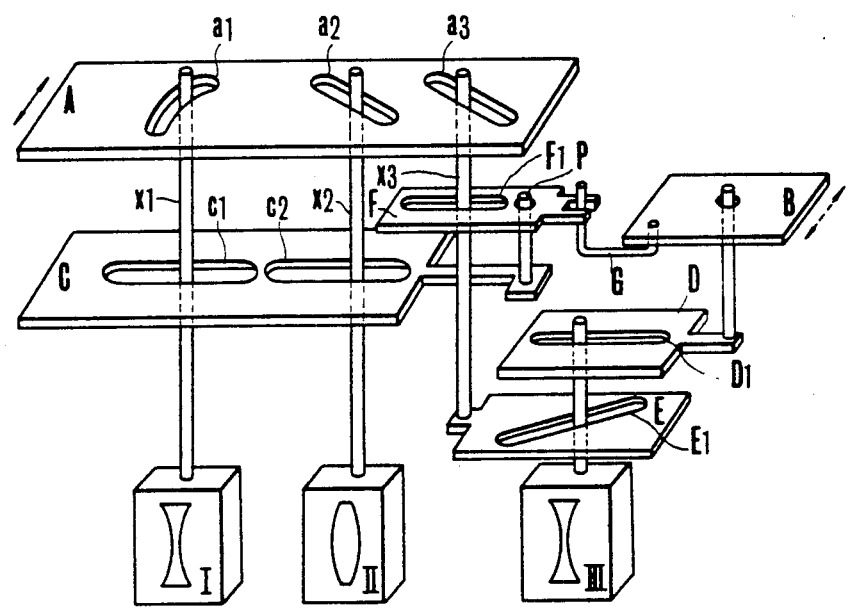
FIG. 4 is an exploded perspective view of an operating mechanism for all the lens groups of the objective of FIG. 2 or 3.
Figure 5:
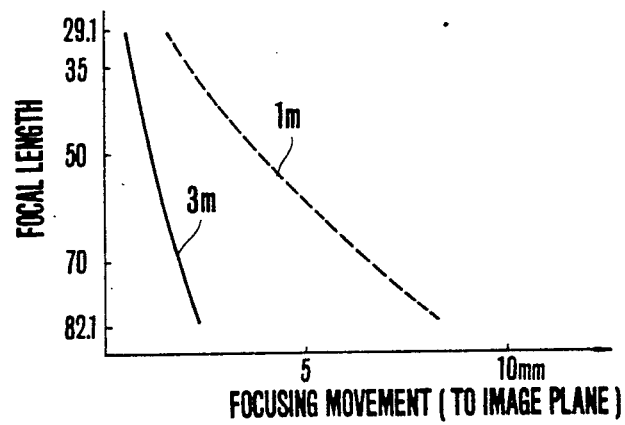

DETAILED DESCRIPTION OF THE PREFERRED EMBODIMENTS:

In the embodiments of the present invention, the zoom objective comprises a diverging first lens group, a converging second lens group and a diverging third lens group. The second and third lens groups move forward when the system is zoomed from the wide angle to the telephoto setting (see FIG. 2).

In tracing the rays of light coming from an infinitely distant object and entering through the paraxial region of the first lens group, it is proven that the ratio of the angle of incidence, $\alpha$, on the third lens group to the angle of emergence, $\alpha'$, therefrom, or $\alpha/\alpha'$, always takes a positive value, or a value larger than unity, during zooming. When the focusing is provided at the third lens group, the direction of the focusing movement of the third lens group, while changing the focus from an infinitely distant object to an object at the shortest distance, is always unchanged from rearward at any station in the entire zooming range. It should be pointed out that there is no discontinuity in the curve representing the variation of movement of the focusing group with focal length as in the aforesaid example of the prior art. Also, the requirement movement of the lens group for focusing from infinity to the same shorter distance increases with increase in the focal length of the entire system. Along with this, however, the back focus (the distance from the third lens group to the image plane) is also increased. Moreover, the direction of focusing movement is to the rear so that there is no need to create a particular air separation which allows for focusing by the aforesaid third lens group. This fact implies that no increase in the total length of the lens system and further no increase in the diameter of the front lens members are involved. This contributes to a minimization of the bulk and size of the complete zoom objective. Further, when the ratio of the zooming movement of the second lens group to that of the third lens group is chosen to lie in a range between 1/0.5 and 1/1.4 as in the embodiments of the present invention, it is possible to make the relation between the variation of the focal length and the variation of the focusing movement approximate a straight line.

Though the foregoing has been described in connection with a focusing section of negative power, the refractive power is not particularly necessarily negative and may be positive as well. In the latter case, only that of the movements which effects focusing is subject to change, and this represents no essential difference. Again, the principles of the present invention are applicable to zoom objectives having three lens groups which are movable for zooming and which are of positive, negative and positive refractive powers respectively.

Further, the invention is applicable even to zoom objectives having four or more lens groups movable for zooming, zoom objectives having a lens group which remains stationary during zooming and which is between lens groups movable for zooming, and zoom objectives having lens groups movable for zooming between lens groups which remain stationary during zooming when employed in the rear focusing type zoom objective.

The following explanation uses numerical formulae. At first, as illustrated in FIG. 3, the powers of the first, second and third lens groups are denoted by $\phi_1$, $\phi_2$ and $\phi_3$ respectively, the intervals between their successive principal planes by $e_1$ and $e_2$, and the distance from the third lens group to the image plane by $bf$.

Now, letting $S$ denote the zooming movement of the second lens group, we have the zooming movement of the third lens group which is equal to 'a' times that of the second lens group, or $aS$. To maintain a constant image plane during zooming, the first lens group is required to move a distance, $t$.

Here, for a given a and S, an equation for the t is deduced as follows:

$$t = \frac{C(A + \phi_2 \cdot B) + \phi_1 \cdot B}{-\phi_1(A + \phi_2 B)}$$

where $$A = \phi_3(bf - a \cdot S) - 1$$

$$B = (bf - a \cdot S) - A\{e_2 - S(1-2)\}$$

$$C = 1 - (e_1 + S)\phi_1$$

Then, with an object at a distance l1 from the first lens group, the third lens group is required to move $\Delta X$ to effect focusing. We now have an equation for $\Delta X$ as follows:

$$\Delta X = \frac{-M}{2L} \pm \left\{ \left(\frac{M}{2L}\right)^2 - \frac{N}{L} \right\}^{\frac{1}{2}}$$

where $$a_3 = (1/l1 + \phi_1)(1 + \phi_2 \cdot e_1) - 2$$

$$h_2 = 1 - e_1(1/S_1 + \phi_1)$$

$$L = a_3 \cdot \phi_3$$

$$M = -a_3(bf \cdot \phi_3 - 1) - \phi_3(h_2 - e_2 \cdot a_3) - a_3$$

$$N = (h_2 - e_2 \cdot a_3)(bf \cdot \phi_3 - 1) + bf \cdot a_3$$

This gives the focusing movement at the starting point of zoom range. To obtain a corrected formula for the focusing movement at an intermediate position in the zoom range, substitution for e1 in the above formula by e1−t+S, for e2 by e2−S+aS and for l1 by l1-S suffices.

At this time, in order that the relationship between the variation of the focal length and the focusing movement of the third lens group for the same object distance may be expressed by an equation of primary degree, we let $\Delta X1$ and $\Delta X2$ denote the focusing movements with the second lens group when zoomed by S1 and S2 respectively, and have to determine the 'a' so as to satisfy the following equation:

$$\frac{S2}{S1} = \frac{\Delta X2 - \Delta X}{\Delta X1 - \Delta X}$$

An operating mechanism for the zoom objective having a focusing provision in the third lens group with its focusing movement controllable as a linear function of focal length as has been described above follows:

In FIG. 4, the operating mechanism is depicted in a flatly expanded or exploded form for the purpose of clarity. In the drawing, I, II and III are holders for the first, second and third lens groups respectively; A is a zoom control member; B is a focus control member; and C is a body tube.

The zoom control member A has cut therein cam slots a1, a2 and a3 for zooming the respective lens groups, while the body tube C has cut therein guide slots C1 and C2 for restraining the first and second lens groups from rotation about the optical axis. The focus control member B is operatively connected to a differential member F through a member G, so that when focused on an infinitely distant object, a guide slot F1 in the differential member F is in parallel to the optical axis of the zoom objective.

Now with an object at infinity, when the zoom control member A is turned for zooming purposes, cam follower members x1, x2 and x3 radially extending from the first, second and third lens holders I, II and III respectively are moved axially but in differential relation along with the first, second and third lens groups.

When in the wide angle position, the cam follower or rod x3 takes its place near a point P in the cam slot F1.

Then, when the member B is turned to focus from infinity down to a shorter object distance, a member D turns together therewith. Accordingly the third lens group is driven a distance defined by a cam slot E1 in a member E. At the same time, on the other hand, such movement of the member B is transmitted through the member G to turn the member F about the point P as a fulcrum, causing the rod x3 to change its angular position. This results in turning the member E about the optical axis. Thus, the third lens group III is axially moved by a cam slot E1 as guided by a slot D1.

It should be explained in this connection that even when the angle of rotation of the focusing member B is the same, the amount of axial movement of the rod x3 differs depending upon how long the rod x3 is displaced from the point P as the center of rotation of the member F, or what zooming position. As a result, the focusing movement of the third lens group is differentiated. This means that the same angle of rotation of the focusing actuator on the outer barrel of the lens mounting leads to different focusing movements depending upon the zooming position. In the wide angle position, the rod x3 is near the point P, and when zooming to the telephoto position, it moves away from point P to increase the focusing movement. In order for the operating mechanism of a structure such as illustrated in FIG. 4 to produce accurate focusing throughout the entire zooming range, it is a prerequisite that, in the zoom lens of the invention, the relation between the zooming and the axial movement of the focusing lens group may be expressed by one and the same relation at any object distance. This function must be a linear function. In actual practice, at least an approximation to a straight line needs to be possible. Therefore, a determination of the distance from the point P to the rod x3 may be made to satisfy this linear function.

In the following there are shown examples of specific zoom objectives of the invention.

Examples 1 to 5 are the zoom objectives each having three movable lens groups of focal lengths f1, f2 and f3 with their principal planes in variable intervals l1 and l2 for a range of focal lengths f of the entire system.

The variations with focal length of the focusing movement of the third lens group in Examples 1 to 5 are illustrated in FIGS. 5 to 9 respectively.

Examples 1 to 5 employ different ratios of movement of the second lens group to that of the third changing from 1:0.66 to 1:1.25.

Of these specific examples, Example 3 reveals that the relation between the zooming or focal length of the entire system and the focusing movement of the third lens group can be represented by a substantially straight line at both of different object distances of 1 and 3 meters. That is, so long as this relation holds, increasing of the zoom ratio or further shortening of the object distance also insures that the linearization can be almost achieved. With regard to the other examples, though the required axial movement of the focusing group is more or less curved to a secondary degree, the zooming range and the focusing range are so narrow as to make the linear approximation acceptable.

| Example 1 | | | | |
|---|---|---|---|---|
| f1 | −45.65 | f | 29.1 | 50 | 82.1 |
| f2 | 33.414 | l1 | 54.8 | 28.43 | 14.07 |
| f3 | −176.505 | l2 | 11.56 | 16.62 | 24.01 |

A:B = 1:0.66 where A and B are the total movements for zooming of the second and third lens groups respectively.

| Example 2 | | | | |
|---|---|---|---|---|
| f1 | −46.3 | f | 29.05 | 50 | 82.1 |
| f2 | 33.8 | l1 | 55.65 | 30.02 | 16.12 |
| f3 | −186.15 | l2 | 11.56 | 11.56 | 11.56 |

A:B = 1:1

| Example 3 | | | | |
|---|---|---|---|---|
| f1 | −46.315 | f | 29.05 | 50.38 | 82.43 |
| f2 | 33.799 | l1 | 55.68 | 30.28 | 16.88 |
| f3 | −169.39 | l2 | 15.0 | 14.1 | 12.73 |

A:B = 1:1.05

| Example 4 | | | | |
|---|---|---|---|---|
| f1 | −46.315 | f | 29.05 | 50.13 | 82.14 |
| f2 | 33.799 | l1 | 55.68 | 30.55 | 17.14 |
| f3 | −169.39 | l2 | 15.0 | 13.74 | 11.78 |

A:B = 1:1.07

| Example 5 | | | | |
|---|---|---|---|---|
| f1 | −46.315 | f | 29.05 | 49.88 | 82.01 |
| f2 | 33.799 | l1 | 55.68 | 32.22 | 20.2 |
| f3 | −155.097 | l2 | 18 | 13.04 | 4.08 |

A:B = 1:1.25

Examples 6 and 7 give the numerical data in accordance with which interchangeable objectives for 35 m/m cameras can be constructed, with Example 6 having a range f=29-82.1 mm at F/4 F/4.5 and A:B=1:0.66, and Example 7 having a range f=29-82.2 mm at F/4 and A:B=1:0.8.

In the following tables of Examples 6 and 7, Ri denotes the radius of curvature of the i-th lens surface counting from front, Di the i-th separation counting from front representaing a lens thickness or air separation, and Ni and Vi the refractive index and Abbe number of the glass of the i-th lens element counting from front.

Example 6

F = 29 − 82.1  FNO = 1:4 − 4.5  2ω = 73.6 − 29.4

| | | | |
|---|---|---|---|
| R1 = 131.024 | D1 = 4.45 | N1 = 1.60311 | ν1 = 60.7 |
| R2 = 642381.687 | D2 = 0.12 | | |
| R3 = 74.190 | D3 = 1.92 | N2 = 1.80400 | ν2 = 46.6 |
| R4 = 21.614 | D4 = 8.98 | | |
| R5 = 350.693 | D5 = 4.54 | N3 = 1.63636 | ν3 = 35.4 |
| R6 = −61.719 | D6 = 0.78 | | |
| R7 = −55.671 | D7 = 1.40 | N4 = 1.80400 | ν4 = 46.6 |
| R8 = 89.969 | D8 = 1.12 | | |
| R9 = 34.879 | D9 = 3.01 | N5 = 1.80518 | ν5 = 25.4 |
| R10 = 62.555 | D10 = Variable | | |
| R11 = 44.496 | D11 = 2.96 | N6 = 1.71300 | ν6 = 53.8 |
| R12 = −1047.465 | D12 = 0.13 | | |
| R13 = 25.777 | D13 = 2.98 | N7 = 1.77250 | ν7 = 49.6 |
| R14 = 50.599 | D14 = 3.15 | | |
| R15 = 25.778 | D15 = 2.67 | N8 = 1.69680 | ν8 = 55.5 |
| R16 = 54.439 | D16 = 0.99 | | |
| R17 = 410.781 | D17 = 2.25 | N9 = 1.84666 | ν9 = 23.9 |
| R18 = 17.137 | D18 = 2.18 | | |
| R19 = 65.163 | D19 = 5.72 | N10 = 1.74950 | ν10 = 35.3 |
| F20 = −49.823 | D20 = Variable | | |
| R21 = −258.095 | D21 = 1.75 | N11 = 1.56732 | ν11 = 42.8 |
| R22 = −76.570 | D22 = 1.07 | N12 = 1.79952 | ν12 = 42.2 |
| R23 = 57.414 | D23 = 2.70 | | |
| R24 = 75.198 | D24 = 2.29 | N13 = 1.64769 | ν13 = 33.8 |
| R25 = −155.372 | | | |

| f | 29 | 56 | 82.1 |
|---|---|---|---|
| D10 | 41.51 | 11.229 | 0.784 |
| D20 | 1.187 | 7.647 | 13.631 |

A:B = 1:0.66

Example 7

F = 29 − 82.2  FNO = 1:4  2ω = 73.6 − 29.4

| | | | |
|---|---|---|---|
| R1 = 143.815 | D1 = 4.41 | N1 = 1.60311 | ν1 = 60.7 |
| R2 = −11075.152 | D2 = 0.15 | | |
| R3 = 72.431 | D3 = 1.93 | N2 = 1.80400 | ν2 = 46.6 |
| R4 = 21.799 | D4 = 8.86 | | |
| R5 = 280.713 | D5 = 4.54 | N3 = 1.63636 | ν3 = 35.4 |
| R6 = −60.457 | D6 = 1.01 | | |
| R7 = −54.113 | D7 = 1.41 | N4 = 1.81600 | ν4 = 46.6 |
| R8 = 91.691 | D8 = 1.20 | | |
| R9 = 36.069 | D9 = 2.91 | N5 = 1.80518 | ν5 = 25.4 |
| R10 = 66.749 | D10 = Variable | | |
| R11 = 40.052 | D11 = 3.80 | N6 = 1.77250 | ν6 = 49.6 |
| R12 = 341.176 | D12 = 2.15 | | |
| R13 = 26.915 | D13 = 3.61 | N7 = 1.71300 | ν7 = 53.8 |
| R14 = 79.675 | D14 = 0.13 | | |
| R15 = 24.767 | D15 = 3.23 | N8 = 1.60311 | ν8 = 60.7 |
| R16 = 51.513 | D16 = 1.41 | | |
| R17 = 780.489 | D17 = 2.54 | N9 = 1.84666 | ν9 = 23.9 |
| R18 = 16.954 | D18 = 3.00 | | |
| R19 = 79.773 | D19 = 3.29 | N10 = 1.74950 | ν10 = 35.3 |
| R20 = −44.533 | D20 = Variable | | |
| R21 = −148.919 | D21 = 1.90 | N11 = 1.60342 | ν11 = 38.0 |
| R22 = −37.656 | D22 = 1.48 | N12 = 1.79952 | ν12 = 42.2 |
| R23 = 57.978 | D23 = 2.25 | | |
| R24 = 63.772 | D24 = 2.56 | N13 = 1.63980 | ν13 = 34.5 |
| R25 = −116.395 | | | |

| f | 29 | 56 | 82.2 |
|---|---|---|---|
| D10 | 41.82 | 11.321 | 0.733 |
| D20 | 1.477 | 5.397 | 9.077 |

A:B = 1:0.8

Figure 10:
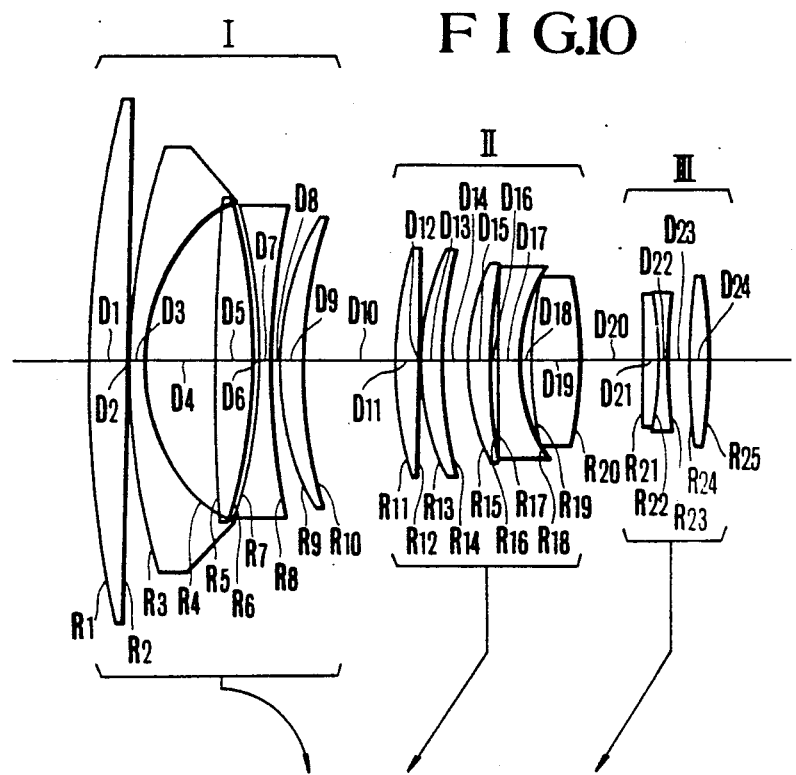
FIGS. 10 and 11 are longitudinal section views of Examples 6 and 7 of the zoom objective of the present invention.
Figure 11:
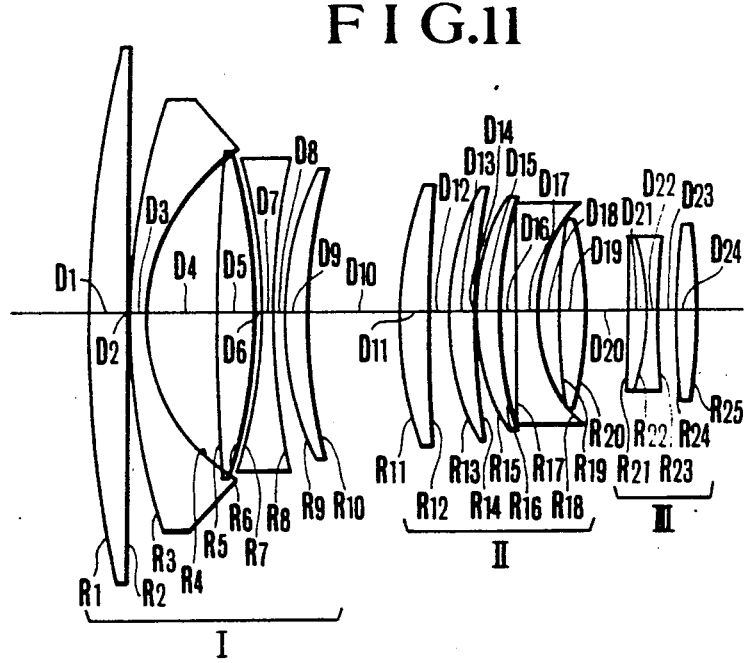

The lens block diagrams of Examples 6 and 7 are given in FIGS. 10 and 11 respectively. Also the aberration curves of Example 6 with object at infinity and at a distance of 3 meters are given in FIGS. 12-a to 12-1 and FIGS. 13-a to 13-1, respectively and those of Example 7 with object at infinity and 3 meters in FIGS. 14-a to 14-1 and FIGS. 15-a to 15-1 respectively.

As will be understood from the graphic representations of the various aberrations, the selection of the third lens group for employment in focusing produces a great advantage that the various aberrations are stabilized against variation of the object distance to facilitate an improvement of the image quality.

As has been described above, the focusing method for the zoom objectives of the invention as compared with the conventional method using the first lens group for the focusing is by moving the rear lens group which can be made considerably smaller in the diameter and lighter in the weight. This contributes to increased compactness, an improvement in manageability, and an increase in imaging performance, and further gives an additional advantage in application of the focusing method of the invention to auto-focus cameras in which some distance information is obtained from the camera body to drive the focusing lens group to move to an automatically adjusted position.

What we claim:

1. A rear focusing zoom lens for zooming over a zooming range, comprising:
   a plurality of optical lens units;
   a movable lens unit movable for focusing arranged on the image side of said optical lens units;
   said optical lens units and said movable lens unit being simultaneously moved for zooming, and said movable lens unit being moved such that the ratio of the incident angle α of the light incident on the movable lens unit to the emergent angle α' of the light therefrom is always maintained larger than 1 during zooming when the light ray from an infinitely distant object is introduced to the rear focusing zoom lens and traced.

2. A rear focusing zoom lens according to claim 1, in which the movable lens unit occupies a position on the optical axis closer to the object when it is at the telephoto end of the zooming range than when at the wide angle end of the zooming range.

3. A zoom lens comprising, from an object side:
   a first lens group;
   a second lens group;
   a third lens group;
   wherein said first, second and third lens groups move simultaneously along an optical axis of the zoom lens at the time of zooming, with said third lens group moving forward when zooming from a wide angle end to a telephoto end of zooming;
   said first and second lens groups are stationary during focusing, with said third lens group moving along the optical axis; and
   changes in the focal length of the whole system and changes in the driving amount of the third lens group are in a substantially linear relation.

* * * * *